(12) United States Patent
Dezonno

(10) Patent No.: US 8,068,597 B2
(45) Date of Patent: Nov. 29, 2011

(54) METHOD AND APPARATUS FOR PROCESSING CUSTOMER CONTACTS USING A STATE MACHINE

(75) Inventor: Anthony Dezonno, Bloomingdale, IL (US)

(73) Assignee: Aspect Software, Inc., Lombard, IL (US)

( * ) Notice: Subject to any disclaimer, the term of this patent is extended or adjusted under 35 U.S.C. 154(b) by 1012 days.

(21) Appl. No.: 10/831,993

(22) Filed: Apr. 26, 2004

(65) Prior Publication Data

US 2005/0238162 A1     Oct. 27, 2005

(51) Int. Cl.
    *H04M 3/00*    (2006.01)
(52) U.S. Cl. ........... 379/265.02; 379/88.17; 379/202.01; 379/265.01; 379/265.09
(58) Field of Classification Search ............... 379/88.17, 379/202.01, 265.01, 265.02, 265.09; 370/352
    See application file for complete search history.

(56) References Cited

U.S. PATENT DOCUMENTS

| | | | |
|---|---|---|---|
| 5,099,510 A * | 3/1992 | Blinken et al. ........... | 379/202.01 |
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,330,325 B1 * | 12/2001 | Reid et al. ................ | 379/265.01 |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,560,236 B1 * | 5/2003 | Varghese et al. ............. | 370/401 |
| 6,732,156 B2 | 5/2004 | Miloslavsky | |
| 6,934,279 B1 * | 8/2005 | Sollee et al. ................ | 370/352 |
| 6,987,756 B1 * | 1/2006 | Ravindranath et al. ....... | 370/352 |
| 2001/0028649 A1 * | 10/2001 | Pogossiants et al. ......... | 370/389 |
| 2002/0141383 A1 | 10/2002 | Schaefer et al. | |
| 2002/0197777 A1 * | 12/2002 | Kim et al. .................... | 438/151 |

(Continued)

*Primary Examiner* — Ahmad Matar
*Assistant Examiner* — Khai N Nguyen
(74) *Attorney, Agent, or Firm* — Husch Blackwell LLP

(57) ABSTRACT

A method and apparatus are provided for processing a call with a client within an automatic contact distributor system. The method includes the step of providing a user agent application within a terminal of an agent of the automatic contact distributor system that functions as an interface for exchanging SIP commands and providing an agent state machine within the terminal of the agent that controls a plurality of call states of a connection of the call between the client and the agent where the agent state machine is different than the user agent application. The method further includes the steps of receiving a SIP INVITE by the user agent application from an automatic contact distributor of the automatic contact distribution system transferring the call from the automatic contact distributor to the agent and depicting a state of the plurality of states of the call on a display of the terminal based upon a logical state of the state machine.

71 Claims, 1 Drawing Sheet

U.S. PATENT DOCUMENTS

| | | |
|---|---|---|
| 2003/0021190 A1* | 1/2003 | Jolidon ............................ 368/80 |
| 2003/0021238 A1 | 1/2003 | Corneliussen et al. |
| 2003/0026214 A1 | 2/2003 | Iveland et al. |
| 2003/0105820 A1* | 6/2003 | Haims et al. ................... 709/205 |
| 2003/0126257 A1* | 7/2003 | Vijay ............................ 709/224 |
| 2003/0128833 A1* | 7/2003 | Peters ....................... 379/265.09 |
| 2003/0145054 A1 | 7/2003 | Dyke |
| 2003/0161448 A1* | 8/2003 | Parolkar et al. ............. 379/88.17 |
| 2004/0037406 A1* | 2/2004 | Gourraud ................. 379/202.01 |
| 2005/0188110 A1* | 8/2005 | Hollatz ......................... 709/244 |

* cited by examiner ial contact application 36 of the ACD 24 may form a client contact file 42 including a tele-

METHOD AND APPARATUS FOR PROCESSING CUSTOMER CONTACTS USING A STATE MACHINE

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers through the public switched telephone network (PSTN). Typically, calls are directed to a common telephone number and distributed to agents based upon some criteria (e.g., agent idle time).

ACDs may process inbound or outbound calls. Typically, a controller monitors a workload of its agents. Where a workload of received calls fall below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) information and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to handling Internet calls. Further, the standards that are used for processing switched circuit calls through the PSTN cannot be used within the Internet. Accordingly, a need exits for a better method of processing calls that is adaptable to both PSTN and Internet calls.

SUMMARY

A method and apparatus are provided for processing a call with a client within an automatic contact distributor system. The method includes the step of providing a user agent application within a terminal of an agent of the automatic contact distributor system that functions as an interface for exchanging SIP commands and providing an agent state machine within the terminal of the agent that controls a plurality of call states of a connection of the call between the client and the agent where the agent state machine is different than the user agent application. The method further includes the steps of receiving a SIP INVITE by the user agent application from an automatic contact distributor of the automatic contact distribution system transferring the call from the automatic contact distributor to the agent and depicting a state of the plurality of states of the call on a display of the terminal based upon a logical state of the state machine.

DETAILED DESCRIPTION OF AN ILLUSTRATED EMBODIMENT

Figure 1:
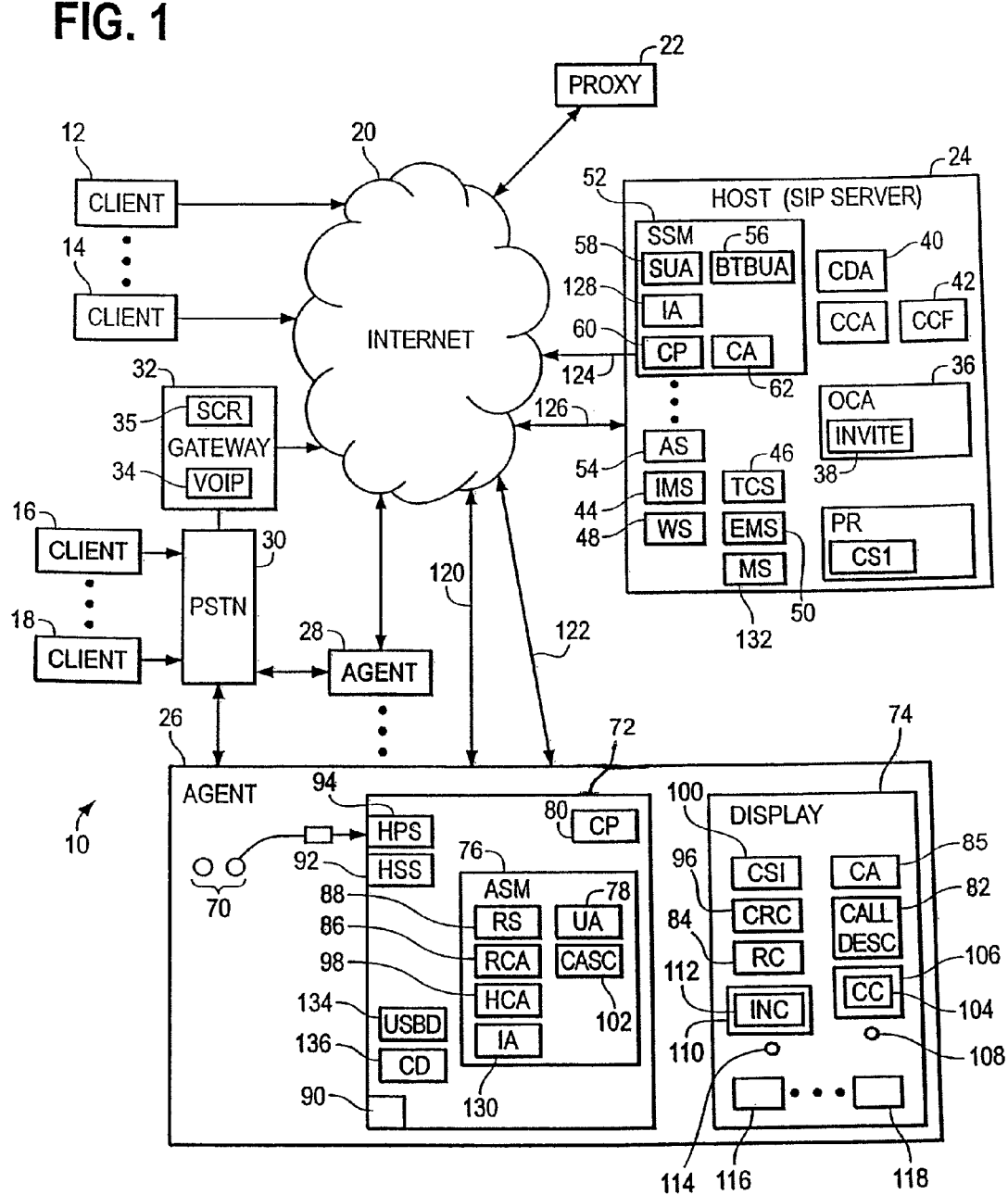
FIG. 1 depicts apparatus for processing calls with clients within an automatic contact distribution system in accordance with an illustrated embodiment of the invention.

FIG. 1 depicts a system 10 for agent contact control under an illustrated embodiment of the invention. Under the illustrated embodiment, contacts may be established between clients 12, 14, 16, 18 and agents 26, 28 under any of a number of different scenarios. For example, if the organization owning and/or using the system 10 is an environmental, political or commercial organization, then the organization may publish (e.g., by advertising or otherwise) contact information for the organization (e.g., a telephone number, Universal Resource Locator (URL), etc.). Alternatively, the organization may obtain contact lists of clients (e.g., by purchasing such lists from commercial sources) and initiate contacts with the clients 12, 14, 16, 18 for purposes of advancing the agenda of the organization.

Outgoing contacts may be initiated by a host 24 (hereinafter referred to as the "automatic contact distributor" or "ACD" 24) primarily through the Internet 20. In this regard, contacts may be initiated to clients 12, 14, 16, 18 under any of a number of different formats (e.g., e-mails, pop-up ads, direct telephone calls, etc.). Where a contact is initiated as a telephone call, an outgoing contact application (OCA) 36 of the ACD 24 may form a client contact file 42 including a telephone number of the client and a purpose of the call. The OCA 36 may then compose and transfer a Session Initiation Protocol (SIP) INVITE 38 (as defined by Internet Engineering Task Force (IETF) RFC #3261) to a gateway 32 connected to the public switched telephone network (PSTN). The INVITE may include a telephone number of a client 16, 18 to which the contact is directed as well as an identifier (e.g., a code plug) of a telephone call server 46 within the ACD 24. The INVITE 38 may also include instructions to the gateway 32 to activate a Voice-over-Internet Protocol (VOIP) application 34.

Within the gateway 32, the INVITE may be converted into a call request that, in turn, is transferred to the PSTN 30. The PSTN 30, in turn, processes the call request and, ultimately, connects the call with the client 16, 18 to the gateway 32.

Upon connection of the call with the client 16, 18 to the gateway, the gateway 32 may return a SIP OK message (as defined by IETF RFC #3261) to the telephone call server 46 indicating acceptance and connection of the call. The telephone call server 46 may correlate the call with the client contact file 42 for further processing (as discussed in more detail below) using the call identifier (Call-ID) of the SIP OK message.

Similarly, the outgoing contact application 36 may compose pop-up ads or e-mails to existing or prospective clients 12, 14. In each case, the OCA 36 may open a client contact file 42 as a means of correlating a response to an objective of the call.

The ACD 24 may also receive and process incoming calls using similar processes. For example, the organization using the system 10 may subscribe to a number of telephone numbers associated with the gateway 32. A telephone call from a client 16, 18 directed to the gateway 32 may activate a SIP application 35 that may compose a SIP INVITE to the ACD 24 for the purpose of seting up a VOIP connection between the gateway 32 and the ACD 24. The SIP INVITE may contain a dialed telephone number and the telephone number of the client 16, 18 for purposes of agent selection.

Similarly, the organization using the system 10 may publish e-mail addresses or URLs associated with the organization. For example, if the organization is a merchant, then the organization may subscribe to a number of communication system identifiers (e.g., telephone numbers, e-mail addresses, URLs, etc.) where each identifier may be intended for a particular product or product line.

In the case of e-mails, an e-mail server 50 may be provided for receiving and processing each e-mail addressed to the organization. Similarly, a web server 48 and an instant messaging server 44 may be provided for receiving and processing contacts with clients 12, 14, 16, 18.

In the case of the web server 48, one or web pages may be provided with information that advances the agenda of the organization. Located on one or more of the webpages may be softkeys that allow a contact 12, 14 to request a connection with an agent 26, 28. In this regard, the client 12, 14 may be given a choice of any of a number of different contact mediums (e.g., e-mail, instant messaging, VoIP, etc.) based upon the softkey selected.

In each of the cases discussed above, a contact request message may be sent to the appropriate server 44, 46, 48, 50. The contact request may be used by the server 44, 46, 48 to set up a connection between the client and a selected agent 26, 28.

Upon delivery of a contact request to a server 44, 46, 48, 50 (whether initiated by the client 12, 14, 16, 18 or ACD 24), a contact distribution application 40 may retrieve the contact request and select and distribute the call to an agent 26, 28 for purposes of handling the call. To select an agent, the contact distribution application 40 may first retrieve the client contact file 42 and then select an agent based upon the information found within the file 42. For example, if an identifier of the client can be matched to an existing client, then an agent 26, 28 may be selected based upon prior contacts with the same client. If the client cannot be identified, then agent selection may be based upon the contact target used by the client.

Upon selection of an agent 26, 28, a server state machine 52, 54 may be assigned to the call. The server state machine 52, 54 acts as a state machine that occupies a predetermined number of states based upon agent input. The server state machine 52, 54 operates in conjunction with an agent state machine to control the functionality of an agent station by tracking the state of the agent state machine. As used herein, tracking a state of the agent state machine by the server state machine means that the server state machine has assumed a predetermined state that corresponds to the state of the agent state machine.

The server state machine 52, 54 also functions as a connection link between the client 12, 14, 16, 18 and the agent 26, 28 that was previously selected to handle the call with the client 12, 14, 16, 18. In effect, the server state machine 52, 54 functions as a message relay between the client and agent.

In each case, the server state machine 52, 54 functions to retain control of the call. In this case, retaining control of the call means that the server state machine 52, 54 acts as an intermediary to relay messages received by the server state machine 52, 54 on a first leg of the connection from an assigned agent 26, 28 to the client 12, 14, 16, 18 and to relay messages received by the server state machine 52, 54 on a second leg of the connection from the client 12, 14, 16, 18 to the agent 26, 28. The server state machine 52, 54 (ACD 24) may do this to maintain the anonymity of the agent 26, 28.

To set up the connection, the contact distribution application 40 may transfer the customer contact file 42 to a call processor 60 within the selected server state machine 52, 54 along with the URL or universal resource indicator (URI) of the client contact and an identifier of the selected agent. A setup user agent application 58 within the server state machine 52, 54 operating under control of the call processor 60 may then compose and send a SIP INVITE to the selected agent 26, 28 requesting setup of the first leg of the communication link between the selected agent 26, 28 and the server state machine 52, 54. The SIP INVITE to the selected agent 26, 28 may be under the same format as the second, previously established leg of the call between the client 12, 14, 16, 18 and the respective server state machine 52, 54.

Turning now to the agent station 26, 28, an explanation will be provided of the operation of the agent station 26, 28 and the interaction of the agent station 26, 28 with the server state machine 52, 54. As shown in FIG. 1, each agent station 26, 28 may include a terminal 72 and display 74. A headset 70 may be provided to allow the agent to interact with clients in an otherwise noisy environment. Included within the terminal 72 may be an agent state machine 76. While the agent station 26, 28 is described in terms of a terminal 72 and display 74, it should be understood that the agent station 26, 28 could be provided in the form of a conventional SIP telephone with programming features as described in more detail below.

Upon receipt of the SIP INVITE from the server state machine 52, the SIP INVITE is transferred to and decoded within a user agent application 78 (as defined by IETF RFC #3261). As used herein, an user agent application is a SIP interface that controls calls placed under the SIP protocol.

The information from the decoded INVITE may be forwarded to a call processor 80. The call processor 80 may display the specifics of the call in an informational window 82 on the display 74. Upon reviewing the call, the agent may accept the call by activating a call accept softkey 85.

Activation of the call accept softkey 85 may cause the user agent 78 of the agent station 26, 28 to return a SIP OK message to the setup user agent 58 of the server state machine 52. If the original SIP INVITE to the agent 26, 28 had been under VoIP, then the SIP OK may authorize set up of the first link under a VoIP format. If the SIP INVITE had been under an e-mail or instant messaging format, then the SIP OK may have accepted the call under that format.

Upon receiving the SIP OK from the agent 26, 28, the call processor 60 may transfer a URL or URI of the agent and a URL or URI of the client 12, 14, 16, 18 to a back-to-back user agent (BTBUA) 56 (as defined under IETF RFC #3261). The BTBUA 56 functions to insert a first URI of the BTBUA 56 into the source address field of any messages sent to the client and a second URI of the BTBUA 56 into a source address field of any messages sent to the agent 26, 28. The net effect is that the BTBUA 56 readdresses and forwards messages from the client 12, 14, 16, 18 to the selected agent 26, 28 and readdresses and forwards messages from the agent 26, 28 to the client 12, 14, 16, 18.

While call set up and control of contacts between an agent (e.g., agent 26) and the contact distributor 24 may be accomplished through a single connection 120, 124, other illustrated embodiments may include a first connection 120, 124 and a second connection 122, 126 between the server state machine 52 and the agent state machine 76. The first connection 120, 124 may be used in support of contacts between agents 26, 28 and clients 12, 14, 16, 18. The second connection 122, 126 may be used in support of message exchange between the server state machine 52 and the agent state machine 76. An interface application 128 within the server state machine 52 and an interface application 130 within the agent state machine 76 may function to relay messages at a terminus of the connection between appropriate destinations.

The agent state machine 76 in conjunction with the server state machine 52 together provides a number of states and other features not available under prior art methods. For example, the agent state machine 76 may assume such states as "ON", "OFF" or "HOLD" states. As used herein, a call appearance control OFF state means that a call has been disconnected. A call appearance ON state means that a call is connected and the agent and client are exchanging information. A call appearance HOLD state means that a call has been placed in a state where the exchange of messaging information has been temporarily suspended.

Alternatively, the agent state machine 76 may assume a number of other states that effect call presentation. For example, a ringer control application 86 within the agent state machine 76 may control the status of a ringer 90.

For example, a conventional SIP telephone would cause the ringer 90 to begin ringing upon arrival of a SIP INVITE. The ringer 90 of a conventional SIP telephone would cease ringing when a user removed a handset from a hook switch 92.

The agent station 26, 28 differs from a conventional SIP telephone by a ringer control feature built into the agent state machine 76. In this regard, a ringer status application 86 within the agent state machine 76 is programmed to assume a ringer off status upon start-up. A ringer softkey/display 84 is provided on the display to alter the programmed status. On start-up the softkey/display may indicate the words "RINGER OFF". In the agent should place a cursor over the softkey/display 84 and activate the softkey/display, the status may change to display the words "RINGER ON" and the ringer 90 may announce the arrival of a new call.

In addition, when on, the ringer status application 86 may monitor the proposed communication format within SIP INVITEs. In this regard, a request for a VoIP session may cause the ringer 90 to ring with a shorter more insistent interval than requests under other formats that are not real time.

The agent state machine 76 may also detect a status of the headset 70 using a headset status sensor 94 and a headset control application 98. In this regard, once an agent plugs in his headset 70 and activates a call accept softkey 85, the headset control application 98 detects and stores the headset status. The agent state machine 76 may also send the headset status to the server state machine 52. Once the headset has been connected (indicating that the headset is plugged in), the contact distribution application 40 will connect a new call to the agent 26, 28 each time that the agent activates the call release softkey 96. In this regard, the hook switch 92 may not be used and is not needed in the control and delivery of calls to agents 26, 28. In addition, when the headset control application 98 detects that the headset 70 has been disconnected, the headset control application 98 places any connected call on HOLD (see below for a description of the HOLD function).

When the headset control application 98 detects the disconnection of the headset 70 via the headset status sensor 94, the headset control application 98 may send a a HEADSET DISCONNECTED message to the server state machine 52 as SIP data appended to a SIP BYE or PRESENTITY message. Alternatively, a HEADSET DISCONNECT message may be sent over the secondary channel 122, 126. In either case, a media server 132 that also provides resources for client audio channels, such as announcements and tones, may mute the connection over the second leg of the contact connection.

Detection of a HEADSET DISCONNECTED message from the agent 26, 28 causes the contact distribution application 40 to cease distributing calls to the agent 26, 28 until the headset 70 is again reconnected. In addition, when the headset control application 98 detects disconnection of the headset 70, the headset control application 98 may block any further changes to the agent state machine 76 until the headset 70 is again reconnected.

Instead of sending a HEADSET DISCONNECT message as part of A BYE or PRESENTITY message, the agent state machine 76 may also send a HEADSET DISCONNECT message as part of an INFO SEND or OPTIONS messages, as defined by IETF RFC #3261. In the case where a client is still connected under a VoIP format, a HEADSET DISCONNECT message may be processed accordingly. Under one embodiment, a HEADSET DISCONNECT may generate a message that is transmitted back along the communication path towards the client. The message may be intercepted by the server state machine 52 or it may not be. For example, under a first embodiment, the disconnection of the headset may cause the agent state machine 76 to send a re-INVITE to the client with a new Session Description Protocol (SDP) in an attempt to re-establish the contact. Alternatively, where INFO SEND or OPTIONS messages are used, the agent state machine 76 may send a HEADSET DISCONNECT message to the server state machine 52 and the set user agent 58 may compose and send the re-INVITE to the client.

As a further alternative, the server state machine 52 may not notify the client of the disconnect and may instead instruct the media server 132 to activate the ringer 90 on the agent station 26, 28 to notify the agent that contact has been lost. Specific ringer cadences may be selected that distinctly warn the agent that has headset has been disconnected while an active contact was in progress.

Additional features of the agent station 26, 28 may include a USB cable detector 134 and a sound card detectors 136. In the event of either of these events, an appropriate message may be sent to the server state machine 52 and appropriate action taken. As above, the media server 132 may activate the ringer 90 on the agent station. In addition, the server state machine 52 may download an appropriate troubleshooting message through the primary or secondary connection for presentation on the display 74.

The agent state machine 76 also provides a call appearance state control 102 and a call appearance display element 100. The call appearance state control 102 may assume a number of states based upon control elements appearing on the display 74. For example, during initialization of the agent station 26, 28, the call appearance state control 102 is initialized to a first call state. In a call state one, the call appearance display element 100 may not appear on the display 74 or may appear with a black color with the words "CALL APPEARANCE STATUS" superimposed on the element 100.

When the agent activates the call acceptance softkey 85, the call appearance state control 102 may assume a second state (i.e., call state 2). When the call state control 102 assumes the call state 2, the display element 100 may assume a green color. Activation of the call release control causes the call state control 102 to assume the first state.

Located on the display 74 may be a softkey 104 entitled "CONFERENCE CALL SETUP". Activation of the CONFERENCE CALL SETUP button 104 causes the call state control 102 to assume a third state. When the call state control 102 assumes the third state, the call appearance element 100 may assume a red color.

When the call state control 102 assumes the third state, the softkey 104 may be replace with an interactive window 106. The interactive window allows the agent to enter identifying information of any third party to be conferenced into the call.

The agent may enter a communication system identifier (e.g., a telephone number, URL, URI, etc.) into the interactive window 106 and activate a "CONFERENCE ADD" softkey 108. Activation of the CONFERENCE ADD softkey 108 causes the call state controller 102 to enter a fourth state.

Activation of the CONFERENCE ADD softkey 108 also causes the call processor 80 to transfer the communication system identifier to the user agent 78. The user agent 78 may append the third party identifier into a data field of a PRESENTITY message (as defined by IETF RFC #3261) that is then sent to the server state machine 52 over either the primary communication channel 120, 122 or the secondary channel 122, 126.

Within the server state machine 52, the call processor 60 transfers the third party communication system identifier to the setup user agent 58. The setup user agent 58 composes a SIP INVITE and sets up the call with the third party under the same format as the existing call between the client and agent. Once the call with the third party is set up, the call information of the client 12, 14, 16, 18, the agent and the third party are routed to a combining application 62. A second BTBUA 56 may also be added to process information exchanged with the third party.

Within the combining application, contact information of the respective parties may be combined and distributed to the respective parties of the conference call. For example, if the call is a VOIP call, then the audio information of the respective parties may be combined and distributed. In the example above, the audio information from the third party and client may be combined and forwarded to the agent. Similar, the information from the agent and client may be combined and sent to the third party. Finally, the audio information from the third party and agent may be combined and sent to the client.

Once the agent activates the CONFERENCE ADD softkey 108, the conference may be set up within the server state machine 52. The server state machine 52 may return notification of successful set up of the conference call as additional data within a SIP acknowledge message. The return of the SIP acknowledge message may cause the agent state machine 76 to enter a fourth state. Entry of the agent state machine 76 into the fourth state may cause the call appearance element 100 to assume a flashing green color (e.g., flashing at ½ second intervals) to indicate the successful set up of a conference call.

Located on the display 74 may be a softkey 112 entitled "IM CONFERENCE" for setting up an instant messaging conference. Activation of the IM CONFERENCE button 112 causes the call state control 102 to assume a fifth state. When the call state control 102 assumes the fifth state, the call appearance element 100 may assume a yellow color.

When the call state control 102 assumes the fifth state, the softkey 112 may be replace with an interactive window 110. The interactive window allows the agent to enter identifying information of any third party to be conferenced into the IM call.

The agent may enter a communication system identifier (e.g., URL, URI, etc.) into the interactive window 110 and activate a "CONFERENCE ADD" softkey 114. Activation of the CONFERENCE ADD softkey 114 causes the call processor 80 to transfer the communication system identifier to the user agent 78. The user agent 78 may append the third party identifier into a data field of a PRESENTITY message that is then sent to the server state machine 52.

Within the server state machine 52, the call processor 60 transfers the third party communication system identifier to the setup user agent 58. The setup user agent 58 composes a SIP INVITE and sets up the call with the third party under the same format as the existing call between the client and agent. Once the call with the third party is set up, the call information of the client 12, 14, 16, 18, the agent and the third party are routed to a combining application 62. A second BTBUA 56 may also be added to process information exchanged with the third party.

Within the combining application, contact information of the respective parties may be combined and distributed to the respective parties of the conference call. In the case of instant messaging, text from the client is distributed to the third party and agent. Similarly, text from the agent is distributed to the third party and client and text from the third party is distributed to the agent and client.

Once the agent activates the CONFERENCE ADD softkey 114, the conference may be set up within the server state machine 52. The server state machine 52 may return notification of successful set up of the conference call as additional data within a SIP acknowledge message. The return of the SIP acknowledge message may cause the agent state machine 76 to enter a sixth state. Entry of the agent state machine 76 into the sixth state may cause the call appearance element 100 to assume a flashing yellow color (e.g., flashing at ½ second intervals) to indicate the successful set up of an IM conference call.

When the agent station 26, 28 enters a conference call state, a set of boxes 116, 118 may be displayed with identifiers of participants to the conference. In order to drop one or more participants, the agent simply clicks on a box 116, 118 and activates the call release softkey 96.

In another embodiment of the invention, functionality of the agent state machine 76 is relocated to the server state machine 52. In this embodiment, an agent user agent 138 and a display interface 140 remain within the agent station 26, 28 to display information to the agent and to receive agent input. In this case, softkey activations (as discussed above) are detected by the display interface 140 and transferred back to the server user agent 52 via SIP INFO SEND or SIP OPTIONS messages or suffixes to other SIP commands, as also discussed above. Display elements shown on the display 74 (as discussed above) may be transferred to the display using a similar methodology.

A specific embodiment of a method and apparatus for controlling a call at an agent station has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing a call with a client within an automatic contact distributor system, such method comprising the step of:
   providing a user agent application within a terminal of an agent of the automatic contact distributor system that functions as an interface for exchanging Session Initiation Protocol (SIP) commands;
   providing an agent state machine within the terminal of the agent that controls a plurality of call states of a connection of the call between the client and the agent where the agent state machine is different than the user agent application and assigning a server state machine within an automatic contact distributor of the contact distributor system to the call to control the agent terminal by tracking states of the agent state machine such that the server state machine assumes a state that corresponds to a current state of the agent state machine and by serving as a connection link between the client and the agent while retaining control of the call;

receiving a SIP INVITE by the user agent application, the SIP INVITE composed and initiated from the server state machine of the automatic contact distributor of the automatic contact distribution system, requesting set-up of a communication link between the agent state machine and the server state machine;

transferring the call from the automatic contact distributor to the agent in response to a return SIP message initiated by the agent to the server state machine of the automatic contact distributor, the server state machine readdressing and forwarding messages between the client and the agent; and depicting a state of the plurality of states of the call on a display of the terminal based upon a logical state of the state machine.

2. The method of processing the call as in claim 1 further comprising controlling the state machine using a plurality of softkeys disposed on the display of the terminal.

3. The method of processing the call as in claim 2 further comprising the server state machine within the automatic call distributor that tracks states of the agent state machine and acts as an intermediary to relay to the client messages received from the agent by the server state machine, and relays to the agent messages received from the client by the server state machine.

4. The method of processing the call as in claim 3 wherein the server state machine further comprises a call appearance controller and wherein a first connection between the server state machine and the agent state machine supports contacts between agents and clients, while a second such connection supports message exchange between the server state machine and the agent state machine.

5. The method of processing the call as in claim 4 wherein the call appearance controller within the state machine further comprises a first and second state with regard to the call wherein the call appearance controller assumes a second state when the call is connected and the first state when the call is terminated.

6. The method of processing the call as in claim 1 further comprising a gateway coupled to a PSTN composing and sending a SIP INVITE to the automatic contact distributor to set up the call, and the automatic contact distributor selecting the agent in response thereto.

7. The method of processing the call as in claim 5 further comprising providing a call termination softkey that causes the call appearance controller to assume the first state.

8. The method of processing the call as in claim 7 further comprising the agent state machine sending a call termination message to the server state machine when agent state machine enters the first state by activation of the call termination softkey.

9. The method of processing the call as in claim 5 further comprising the call appearance controller assuming a third state called a hold state.

10. The method of processing a call as in claim 9 further comprising providing a hold softkey that causes the call appearance controller to assume the third state.

11. The method of processing the call as in claim 10 further comprising disconnecting an audio interface between the terminal of the agent and the agent when the call appearance controller is in the third state.

12. The method of processing the call as in claim 10 wherein the call appearance element further comprises a red color when the call appearance controller is in the third state.

13. The method of processing the call as in claim 12 further comprising reconnecting the call and returning the agent state machine from the third state to the second state when the call appearance display element is activated.

14. The method of processing the call as in claim 9 wherein the call appearance control further comprises a fourth state called a CONFERENCE CALL set-up state.

15. The method of processing the call as in claim 14 further comprising providing a CONFERENCE CALL setup softkey for selecting the fourth state.

16. The method of processing the call as in claim 15 further comprising providing an interactive window for receiving identifying information from the agent of any third party to be added to a contact connection with the call and agent.

17. The method of processing the call as in claim 16 wherein the call appearance display element depicting the CONFERENCE CALL state for the call further comprises a red color.

18. The method of processing the call as in claim 16 wherein the call appearance control further comprises a fifth state called a CONFERENCE ADD state.

19. The method of processing the call as in claim 18 further comprising providing a CONFERENCE ADD softkey for selecting the fifth state.

20. The method of processing the call as in claim 19 wherein the call appearance display element depicting the CONFERENCE ADD state for the call further comprises a flashing green color.

21. The method of processing the call as in claim 14 wherein the call appearance control further comprises a sixth state called an Instant Message (IM) MESSAGING CONFERENCE set-up state for the call.

22. The method of processing the call as in claim 21 further comprising providing a text IM MESSAGING CONFERENCE setup softkey for selecting the sixth state.

23. The method of processing the call as in claim 22 further comprising providing an interactive window for the agent to enter identifying information of any third party to be added to a contact connection between the client and agent.

24. The method of processing the call as in claim 23 wherein the call appearance display element depicting the IM MESSAGING CONFERENCE set-up state for the call further comprises a flashing yellow color.

25. The method of processing the call as in claim 24 wherein the call appearance control further comprises a seventh state called a IM MESSAGING CONFERENCE state.

26. The method of processing the call as in claim 25 further comprising providing a IM MESSAGING CONFERENCE softkey for selecting the seventh state.

27. The method of processing the call as in claim 26 wherein the call appearance display element depicting the IM MESSAGING CONFERENCE state for the call further comprises a flashing yellow color.

28. The method of processing the call as in claim 1 further comprising displaying an icon representing each participant to the call on the terminal of the agent.

29. The method of processing the call as in claim 28 providing a call release control softkey that allows selection of a participant to the call and disconnection of the selected participant when the call release softkey is activated.

30. The method of processing the call as in claim 29 further comprising automatically assigning another call with a client to the agent upon detection of activation of the call release control by the automatic call distributor.

31. The method of processing the call as in claim 2 further comprising detecting disconnection of a headset of the agent and placing the call on hold.

32. The method of processing the call as in claim 2 further comprising detecting activation of the call release control and sending notification of the activation to the Automatic Contact Distributor (ACD) state machine.

33. The method of processing the call as in claim 32 where the step of detecting disconnection further comprises sending a re-INVITE to the client.

34. The method of processing the call as in claim 33 where the step of detecting disconnection further comprises activating a ringer within a terminal of the agent.

35. The method of processing the call as in claim 33 where the step of activating the ringer further comprises sending a predefined ringer cadence to notify the agent of the disconnect.

36. The method of processing the call as in claim 1 further comprises determining a call type of the call and activating a ringer on the terminal of the agent with a predetermined cadence determined by the determined call type.

37. The method of processing the call as in claim 1 further comprises detecting a disconnection by the USB cable detector in the terminal of the agent and activating a ringer on the terminal of the agent with a predetermined cadence.

38. The method of processing the call as in claim 1 further comprises detecting a disconnection by a sound card detector within the terminal of the agent and activating a ringer on the terminal of the agent with a predetermined cadence.

39. An apparatus for processing a call with a client within an automatic contact distributor system, such apparatus comprising:
   a user agent application within a terminal of a selected agent of the automatic contact distributor system that functions as an interface for exchanging Session Initiation Protocol (SIP) commands;
   an agent state machine that controls a plurality of call states of a connection of the call between the client and the selected agent where the agent state machine is different than the user agent application and a server state machine within an automatic contact distributor of the automatic contact distributor system which tracks the agent state machine by assuming a state that corresponds to a current state of the agent state machine;
   a user agent application that receives a SIP INVITE composed and initiated from an automatic contact distributor of the automatic contact distribution system requesting set-up of a communication link between the agent state machine and the server state machine, the server state machine transferring the call from the automatic contact distributor to the selected agent in response to a return SIP OK message initiated by the selected agent and readdressing messages between the client and the agent; and
   a user interface that depicts a state of the plurality of states of the call on a display of the terminal based upon a logical state of the state machine.

40. The apparatus for processing the call as in claim 39 further comprising a plurality of softkeys disposed on the display of the terminal for controlling the call states of the means for controlling.

41. The apparatus for processing the call as in claim 40 further comprising providing a server state machine within the automatic call distributor that tracks a state of the means for controlling.

42. The apparatus for processing the call as in claim 41 wherein the state machine further comprises a call appearance controller.

43. The apparatus for processing the call as in claim 42 wherein the call appearance controller within the state machine further comprises a first and second state with regard to the call wherein the call appearance controller assumes a second state when the call is connected and the first state when the call is terminated.

44. The apparatus for processing the call as in claim 43 further comprising a call appearance display element disposed on a screen of the terminal of the agent that assumes a green color when the call appearance controller is in the second state.

45. The apparatus for processing the call as in claim 43 further comprising a call termination softkey disposed on the terminal of the agent that causes the call appearance controller to assume the first state.

46. The apparatus for processing the call as in claim 44 further comprising the agent state machine sending a call termination message to the server state machine when agent state machine enters the first state by activation of the call termination softkey.

47. The apparatus for processing the call as in claim 43 further comprising the call appearance controller being adapted to assume a third state called a hold state.

48. The apparatus for processing the call as in claim 47 further comprising providing a hold softkey that causes the call appearance controller to assume the third state.

49. The apparatus for processing the call as in claim 48 further comprising disconnecting an audio interface between the terminal of the agent and the agent when the call appearance controller is in the third state.

50. The apparatus for processing the call as in claim 48 wherein the call appearance element further comprises a red color when the call appearance controller is in the third state.

51. The apparatus for processing the call as in claim 50 further comprising the agent state machine being adapted to reconnect the call and return from the third state to the second state when the call appearance display element is activated.

52. The apparatus for processing the call as in claim 47 wherein the call appearance control further comprises a fourth state called a CONFERENCE CALL set-up state.

53. The apparatus for processing the call as in claim 51 further comprising a CONFERENCE CALL setup softkey disposed on the terminal for selecting the fourth state.

54. The apparatus for processing the call as in claim 52 further comprising an interactive window disposed on the terminal for receiving identifying information from the agent of any third party to be added to a contact connection with the call and the agent.

55. The apparatus for processing the call as in claim 53 wherein the call appearance display element depicting the CONFERENCE CALL state for the call further comprises a red color.

56. The apparatus for processing the call as in claim 53 wherein the call appearance control further comprises a fifth state called a CONFERENCE ADD state.

57. The apparatus for processing the call as in claim 56 further comprising providing a CONFERENCE ADD softkey on the terminal for selecting the fifth state.

58. The apparatus for processing the call as in claim 57 wherein the call appearance display element depicting the CONFERENCE ADD state for the call further comprises a flashing green color.

59. The apparatus for processing the call as in claim 52 wherein the call appearance control further comprises a sixth state called a IM MESSAGING CONFERENCE set-up state for the call.

60. The apparatus for processing the call as in claim 59 further comprising an Instant Message (IM) MESSAGING CONFERENCE CALL setup softkey disposed on the terminal for selecting the sixth state.

61. The apparatus for processing the call as in claim 60 further comprising providing an interactive window for the agent to enter identifying information of any third party to be added to a contact connection between the client and agent.

62. The apparatus for processing the call as in claim 61 wherein the call appearance display element depicting the IM MESSAGING CONFERENCE CALL set-up state for the call further comprises a flashing yellow color.

63. The apparatus for processing the call as in claim 62 wherein the call appearance control further comprises a seventh state called a IM MESSAGING CONFERENCE state.

64. The apparatus for processing the call as in claim 63 further comprising providing a IM MESSAGING CONFERENCE softkey for selecting the seventh state.

65. The apparatus for processing the call as in claim 64 wherein the call appearance display element depicting the IM MESSAGING CONFERENCE CALL state for the call further comprises a flashing yellow color.

66. The apparatus for processing the call as in claim 39 further comprising an icon representing each participant to the call disposed on the terminal of the agent.

67. The apparatus for processing the call as in claim 66 further comprising a call release control softkey disposed on the terminal that allows selection of a participant to the call and disconnection of the selected participant when the call release softkey is activated.

68. The apparatus for processing the call as in claim 41 further comprising detecting disconnection of a headset of the agent and placing the call on hold.

69. The apparatus for processing the call as in claim 68 further comprising detecting activation of the call release control and sending notification of the activation to the Automatic Contact Distributor (ACD) state machine.

70. The apparatus for processing the call as in claim 69 further comprising automatically assigning another call with a client to the agent upon detection of the call release control by the automatic call distributor.

71. The method of interfacing a selected agent of an automatic call distributor with the automatic call distributor and clients of the automatic call distributor, such method comprising the step of:
provinding a user agent within a terminal of the agent for exchanging Session Initiation Protocol (SIP) commands with the automatic call distributor and clients of the automatic call distributor;
receiving a SIP INVITE composed and initiated from a server state machine within the automatic call distributor assigned to control the call and track an agent state machine in the agent's terminal by assuming a state that corresponds to a state of the agent state machine and transferring a call from a client of the automatic call distributor to the selected agent in response to a return SIP OK message initiated by the agent to the server state machine of automatic contact distributor, the server state machine readdressing and forwarding messages between the client and the agent; and
providing a graphical user interface for use by the agent in controlling the call under SIP.

* * * * *